(No Model.) 2 Sheets—Sheet 1.
F. C. WEIR.
SPRING FROG.
No. 398,104. Patented Feb. 19, 1889.
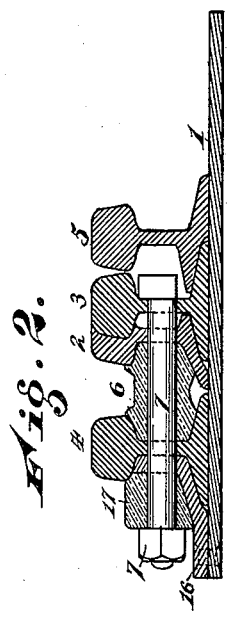
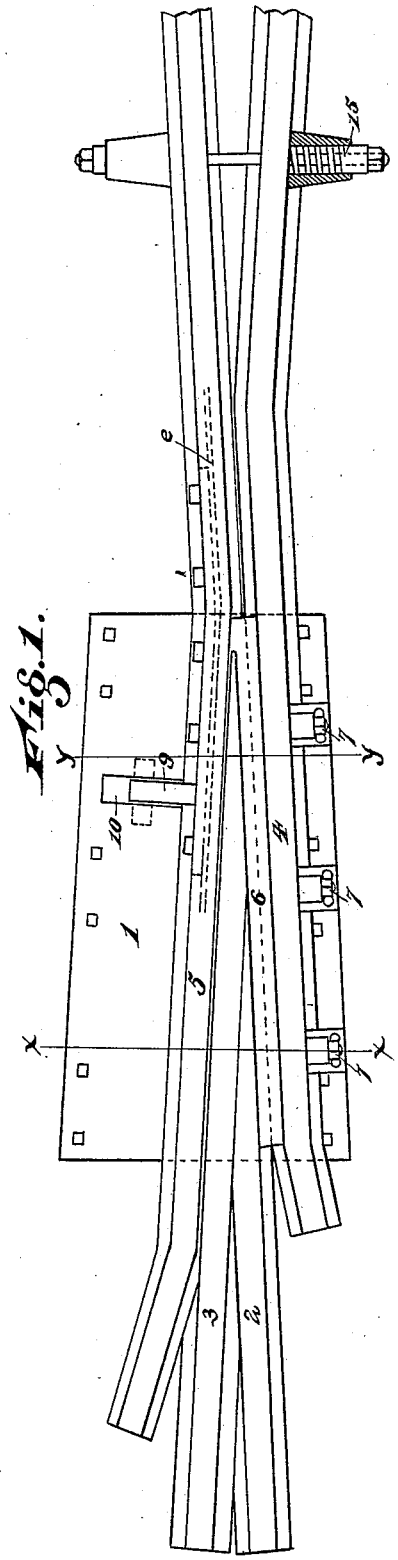
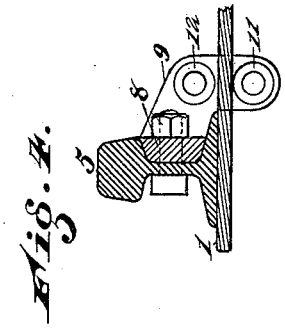
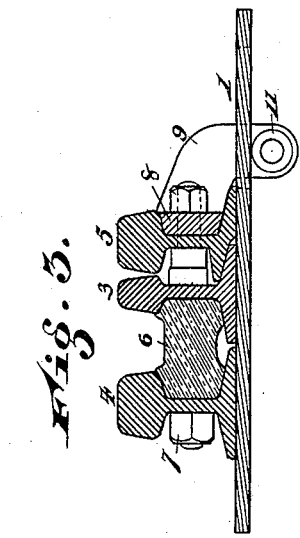
Attest
Inventor
Fredric C Weir
by Wood & Boyd
his Attorneys (No Model.) 2 Sheets—Sheet 2.

F. C. WEIR.
SPRING FROG.

No. 398,104. Patented Feb. 19, 1889.

Attest
J. Watson Sims
T. Simmons

Inventor
Frederic C. Weir
by Wood & Boyd
his Attorneys

UNITED STATES PATENT OFFICE.

FREDRIC C. WEIR, OF CINCINNATI, OHIO.

SPRING-FROG.

SPECIFICATION forming part of Letters Patent No. 398,104, dated February 19, 1889.

Application filed June 19, 1888. Serial No. 277,543. (No model.)

*To all whom it may concern:*

Be it known that I, FREDRIC C. WEIR, of Cincinnati, in the county of Hamilton and State of Ohio, have invented a certain new and useful Improvement in Spring-Frogs, of which the following is a specification.

My invention relates to a spring-frog.

The object of my improvement is to produce a more durable and easier-operating device, all of which will be fully set forth in the description of the accompanying drawings, making a part of this specification, in which—

Figure 5:
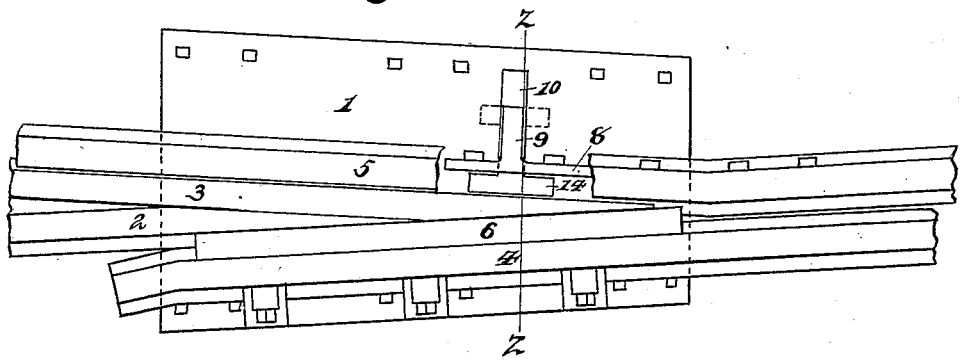
Figure 9:
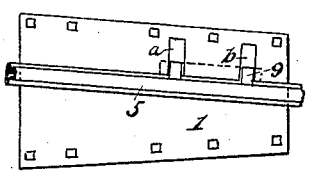
Figure 6:
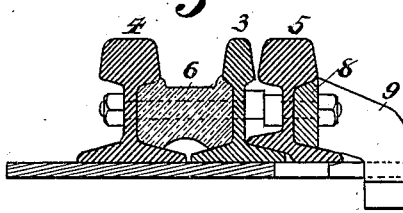
Figure 10:
Figure 7:
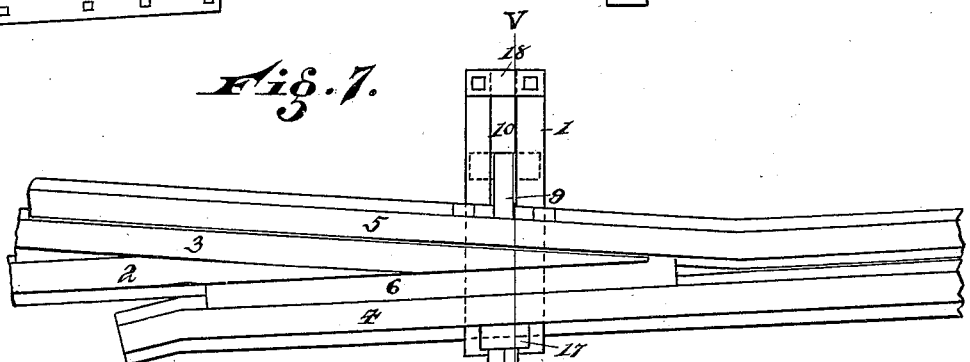
Figure 8:
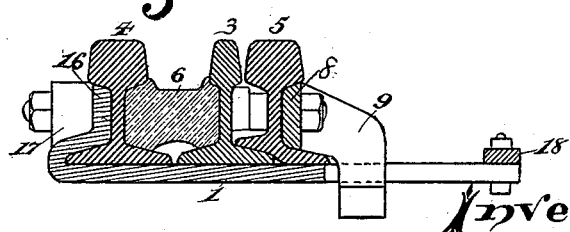

Figure 1 is a top plan view of my improvement. Fig. 2 is a section on line $x\ x$, Fig. 1. Fig. 3 is a section on line $y\ y$, Fig. 1. Fig. 4 is a modification of the method of connecting the spring-rail to the frog-plate. Fig. 5 is a top plan view of a section broken off to show the construction. Fig. 6 is a section on line $z\ z$, Fig. 5. Fig. 7 is a top plan view of a modification. Fig. 8 is a central section on line $v\ v$, Fig. 7. Fig. 9 is a top plan view of another modification. Fig. 10 is a side elevation of Fig. 9.

1 represents a base-plate, on which the frog rests.

2 3 represent the point-rails.

4 represents the stationary rail, and 5 the movable spring-rail.

6 represents the filling between the point and stationary or wing rail.

7 represents through-bolts passing through the point-rail and stationary wing-rail and through filling-block 6, so as to form a rigid construction.

8 represents a fish-plate attached to the depending arm 9, which passes down through the slot 10.

11 represents a friction-roller attached to the under side of the arm 9, adapted to roll against the under side of the plate, and serving the function of holding the spring-rail down.

12 represents a friction-roller on the top of the plate. In Fig. 5 is shown a slot, 14, for insertion of the T of arm 9, so as to place it in position.

15 represents a spring to bring the spring-rail 5 back into position when it has been opened for the passage of a train. In Fig. 7 I have shown a narrow base-plate, simply large enough for the slot 10 and the frictional support of the arm 9 on the under side. It is slotted through at one end to permit the T of the arm 9 to be inserted into slot 10, and the slot is then closed by plate 18.

16 represents a fish-plate attached to the web of the fixed wing-rail and secured to the base-plate.

17 represents a filling-block. In the modifications shown in Figs. 7 and 8 the base-plate 1 is bent up to form a fish-plate support, 16, as shown in Fig. 8. By means of the arm 9, rigidly attached to the spring-rail and turning down through the slot in the base-plate, and with the lug bearing on the other side of said plate, the spring-rail is held against vertical displacement. A friction-roller may be used in said lug. The spring-rail, supported as herein shown, is easily moved on its base in the operation of switching a train.

In Figs. 9 and 10 another modification is shown. $a\ b$ represent slots, and arm 9 is forked and projected down through each of said slots. A yoke, $c$, engages over the forks of said arm 9, which are preferably screw-threaded to receive nuts $d$ to hold said yoke in place and provide the bearing or holding-down support of the spring-rail.

It will be observed in Fig. 1, by the dotted lines $e$, that the plate 8, to which the arm 9 is attached, extends a considerable distance forward of the arm 9. This is for the purpose of not only strengthening the rail against breakage, but it performs another very important office in case of accidental breakage of the rail, as it holds the two sections together and prevents derailment of the train passing over it.

Having described my invention, what I claim is—

1. In combination with the spring-rail 5, the arm 9, bent and projected through the slot in the base-plate, having a movable bearing upon the under side of said plate, substantially as specified.

2. In combination with the spring-rail 5, resting on the base-plate 1, the arm 9, attached to said rail and bent through the slot in said base-plate, and provided with one or more friction-rollers bearing against said plate, substantially as herein specified.

3. A spring-frog composed substantially of the point-rail, the base-plate 1, and fish-plate 16, secured together by through-bolts having spring-rail 5, moving on said base-plate and provided with a frictional bearing-support, substantially as herein specified.

4. In combination with the spring-rail 5, the supporting fish-plate 8, provided with the arm 9, passing through the base-plate, with a holding-down device bearing on the under side of said plate, substantially as specified.

In testimony whereof I have hereunto set my hand.

FREDRIC C. WEIR.

Witnesses:
ROBERT ZAHNER,
J. WATSON SIMS.